US009017009B2

(12) United States Patent
Geith (10) Patent No.: US 9,017,009 B2
(45) Date of Patent: Apr. 28, 2015

(54) HANDLING UNIT FOR RELOCATING PARTS AND METHOD FOR THIS PURPOSE

(75) Inventor: Georg Geith, Murnau (DE)

(73) Assignee: Schunk GmbH & Co. KG Spann—und Greiftechnik, Lauffen am Neckar (DE)

( * ) Notice: Subject to any disclaimer, the term of this patent is extended or adjusted under 35 U.S.C. 154(b) by 1002 days.

(21) Appl. No.: 13/118,609

(22) Filed: May 31, 2011

(65) Prior Publication Data
US 2011/0299964 A1 Dec. 8, 2011

(30) Foreign Application Priority Data
Jun. 8, 2010 (DE) .......................... 10 2010 029 809

(51) Int. Cl.
*B65G 47/90* (2006.01)
*B25J 9/10* (2006.01)

(52) U.S. Cl.
CPC .............. *B65G 47/901* (2013.01); *B25J 9/109* (2013.01); *Y10S 901/16* (2013.01)

(58) Field of Classification Search
CPC .... B65G 47/90; B65G 47/901; B65G 47/905; B65G 47/82; B23Q 5/34; H01L 21/67144
USPC ................ 414/800, 626, 749.1, 749.3, 751.1, 414/222.09, 222.12, 646, 648, 649, 660; 198/468.01, 468.02; 74/55, 490.7, 74/479.01, 480 R, 471 XY, 102, 104; 901/2, 9, 14, 16, 17, 19, 22, 23, 25, 46
See application file for complete search history.

(56) References Cited

U.S. PATENT DOCUMENTS

| 3,988,938 | A | * | 11/1976 | Nagai .................................. 74/53 |
| 4,019,668 | A | * | 4/1977 | Diepeveen ..................... 228/3.1 |
| 4,095,699 | A | * | 6/1978 | O'Neil ........................... 414/660 |
| 4,557,657 | A | * | 12/1985 | Olson et al. .................... 414/180 |
| 4,599,909 | A | * | 7/1986 | Koller ................................ 74/27 |
| 4,740,134 | A | * | 4/1988 | Dixon ............................ 414/733 |
| 4,762,460 | A | * | 8/1988 | Stoll .............................. 414/250 |
| 5,564,888 | A | * | 10/1996 | Doan ........................... 414/751.1 |
| 6,264,419 | B1 | * | 7/2001 | Schinzel ..................... 414/751.1 |
| 6,851,917 | B2 | * | 2/2005 | Feyrer et al. ................ 414/751.1 |
| 2001/0051092 | A1 | | 12/2001 | Mimata |

FOREIGN PATENT DOCUMENTS

| DE | 18 99 385 | 8/1964 |
| DE | 22 01 955 | 8/1973 |
| DE | 36 03 650 | 8/1987 |
| DE | 200 04 746 | 9/2000 |
| DE | 20 2005 005 507 | 8/2005 |
| DE | 10 2006 014973 | 10/2007 |
| EP | 1 538 117 | 6/2005 |
| EP | 1 710 448 | 10/2006 |
| EP | 1710448 | * 10/2006 .............. F15B 15/22 |

OTHER PUBLICATIONS

EP 1710448 English Machine Translation.*

* cited by examiner

*Primary Examiner* — Saul Rodriguez
*Assistant Examiner* — Lynn Schwenning
(74) *Attorney, Agent, or Firm* — Paul Vincent (57) ABSTRACT

A handling unit for relocating parts, comprises a base part and a handling arm, wherein the handling arm is guided in a linear direction along a first axis of movement and along a second axis of movement which extends transversely with respect to the first axis of movement such that it can be adjusted with respect to the base part, and wherein for guiding the handling arm, a guiding cam is provided on the base part and at least one cam follower is provided on the handling arm, wherein a first drive is provided for adjusting the handling arm along the first axis of movement and a second drive is provided for adjusting the handling arm along the second axis of movement.

19 Claims, 7 Drawing Sheets

HANDLING UNIT FOR RELOCATING PARTS AND METHOD FOR THIS PURPOSE

This application claims Paris Convention priority of DE 10 2010 029 809.3 filed Jun. 8, 2010 the complete disclosure of which is hereby incorporated by reference.

BACKGROUND OF THE INVENTION

The invention concerns a handling unit for relocating parts, comprising a base part and a handling arm, wherein the handling arm is guided in a linear direction along a first axis of movement and along a second axis of movement, which extends transversely with respect to the first axis of movement, in such a fashion that it can be adjusted with respect to a base part, and wherein, for guiding the handling arm, a guiding cam is provided on the base part and at least one cam follower is provided on the handling arm.

Conventional handling units of this type are disclosed e.g. in DE 20 2005 005 507 U1 or DE 200 047 46 U1. In particular, gripping devices may be mounted to the free end of the handling arm for gripping parts and relocating them from one position to another position.

It is the underlying purpose of the invention to improve conventional handling units in such a fashion that, in particular, the relocating process is made more flexible.

SUMMARY OF THE INVENTION

This object is achieved by a handling unit comprising the features of the independent claim. A handling unit of this type consequently provides a first drive for adjusting the handling arm along the first axis of movement and a second drive for adjusting the handling arm along the second axis of movement. The two drives are, in particular, linear drives. In principle, the drives can advantageously be driven independently of each other. A handling unit of this type is advantageous in that the motion sequences in the direction of the first axis of movement and in the direction of the second axis of movement can be driven independently of each other due to the provision of two different drives. In particular, only one drive may be driven or both drives may be simultaneously driven depending on which arc sections are to be followed. It is additionally also possible to stop the handling arm in any desired position.

In one advantageous embodiment, at least one of the two drives can be driven in such a fashion that it already loads the handling arm in the direction of its associated axis of movement before the cam follower guided in the cam guide enables movement of the handling arm in the direction of this axis of movement. This realizes a type of preloading and when the cam guidance permits movement in the direction of the respective axis of movement, this movement is consequently introduced very quickly due to the preloading. This realizes an overall strong acceleration of the cam follower in the cam guidance or of the handling arm in the direction of the respective axis of movement. A handling unit of this type consequently achieves increased speed during the relocation of parts.

The base part advantageously comprises a carriage that is guided along the second axis of movement, wherein the handling arm is disposed on the carriage in such a fashion that it can be guided along the first axis of movement. It is thereby feasible for the first drive to be provided between the handling arm and the carriage for moving the handling arm along the first axis of movement and/or the second drive to be provided between the carriage and the base part for moving the carriage along the second axis of movement. Due to the independent design of the drives, the drives may be disposed on the respective corresponding components independently of each other.

It has turned out to be advantageous for the first and/or the second drive to be designed as cylinder piston units which can be pressurized. Drives of this type require a relatively small amount of space, generate large forces and can be correspondingly driven for generating a corresponding pretensioning force.

Advantageously, the piston of the first drive is rigidly disposed on the handling arm and the cylinder of the first drive is formed by the carriage. In a corresponding advantageous fashion, the piston of the second drive is rigidly disposed on the base part and the cylinder of the second drive is formed by the carriage.

An advantageous path of movement is realized when the guiding cam has substantially the shape of a "U" turned upside down and has a first vertical section, an adjacent first arc section, an adjacent horizontal section, an adjacent second arc section and an adjacent second vertical section. It is consequently possible to transfer the handling arms from a lower rear operating position to a front lower operating position using a cam shape of this type.

The base part advantageously comprises appropriate switching elements for detecting the stroke position of the carriage and for actuating the second drive. Corresponding switching elements may also additionally be provided on the carriage for detecting the stroke position of the handling arm and for driving the first carriage. In principle, it is sufficient to only detect the stroke position of the carriage and to drive the two drives in dependence on the stroke position of the carriage.

It is thereby advantageous to provide at least three switching elements on the base part, arranged on top of each other, for detecting three stroke positions of the carriage in such a fashion that a rear lower operating position can be detected and that, upon detection of the rear lower operating position, the second drive is driven for lifting the carriage. The carriage is thereby consequently lifted starting from an initial rear lower position.

A feed position can advantageously be detected prior to reaching an upper operating position, wherein, upon detection of the feed position, the first drive is also driven in addition to the second drive for extending the handling arm. The feed position is thereby advantageously arranged in such a fashion that movement of the handling arm along the first axis of movement is not yet possible. This is achieved in that the handling arm is preloaded in the direction of the first axis of movement with such a force that when the guiding cam enables motion in the direction of the first axis of movement, this motion is performed with high acceleration in the direction of the first axis of movement.

It is furthermore provided that the upper operating position can be detected. When the upper operating position is detected or left, the second drive is operated for lowering the carriage.

It is furthermore provided that the front lower operating position can be detected. In this front lower operating position, the part can e.g. be grasped. During the gripping process, the front lower operating position is maintained. When a confirmatory value is present, i.e. confirmation of a gripping action, the second drive is preferentially operated for lifting the carriage. Shortly before, upon or after reaching the front upper operating position, the first drive may be operated in such a fashion that the handling arm is moved to the rear operating position. Shortly before, upon or after reaching the upper rear operating position, the second drive may be operated in such a fashion that the handling arm is transferred into the rear lower operating position.

Appropriate shock absorbers may be provided on the base part for damping the motion of the carriage upon reaching the lower operating positions.

The axial position of the shock absorbers is advantageously adjustable for adjusting the lower operating position. The vertical position of the lower operating position can consequently be adjusted via the axial position of the shock absorbers.

The above-mentioned object is also achieved by a method for operating an inventive handling unit in that at least one of the two drives is driven in such a fashion that it loads the handling arm in the direction of the associated axis of movement already before the cam follower guided in the cam guidance enables movement of the handling arm in the direction of this axis of movement. This permits comparatively high acceleration of the movement of the handling arm.

It is thereby advantageous when, upon detection of the rear lower operating position, the second drive is driven for lifting the carriage, when before reaching an upper operating position, a feed position has been detected, and upon detection of the feed position parallel to the second drive, the first drive is also driven for extending the handling arm, when upon detection or leaving an upper operating position, the second drive is switched over for lowering the carriage and/or when upon detection of the front lower operating position, the second drive remains switched on, is switched off or switched over.

Further advantages and advantageous embodiments of the invention can be extracted from the following description by means of which the embodiment illustrated in the figures is described and explained in more detail.

DESCRIPTION OF THE PREFERRED EMBODIMENT

FIGS. 1 through 12 show a handling unit 10 comprising a base part 12, a carriage 14 and a handling arm 16. The handling arm is adjustably guided in the carriage 14 in a linear direction along a first axis of movement 18. The carriage 14 itself is adjustably guided on the base part 12 along a second axis of movement 20 which extends transversely with respect to the first axis of movement 18.

Figure 1:
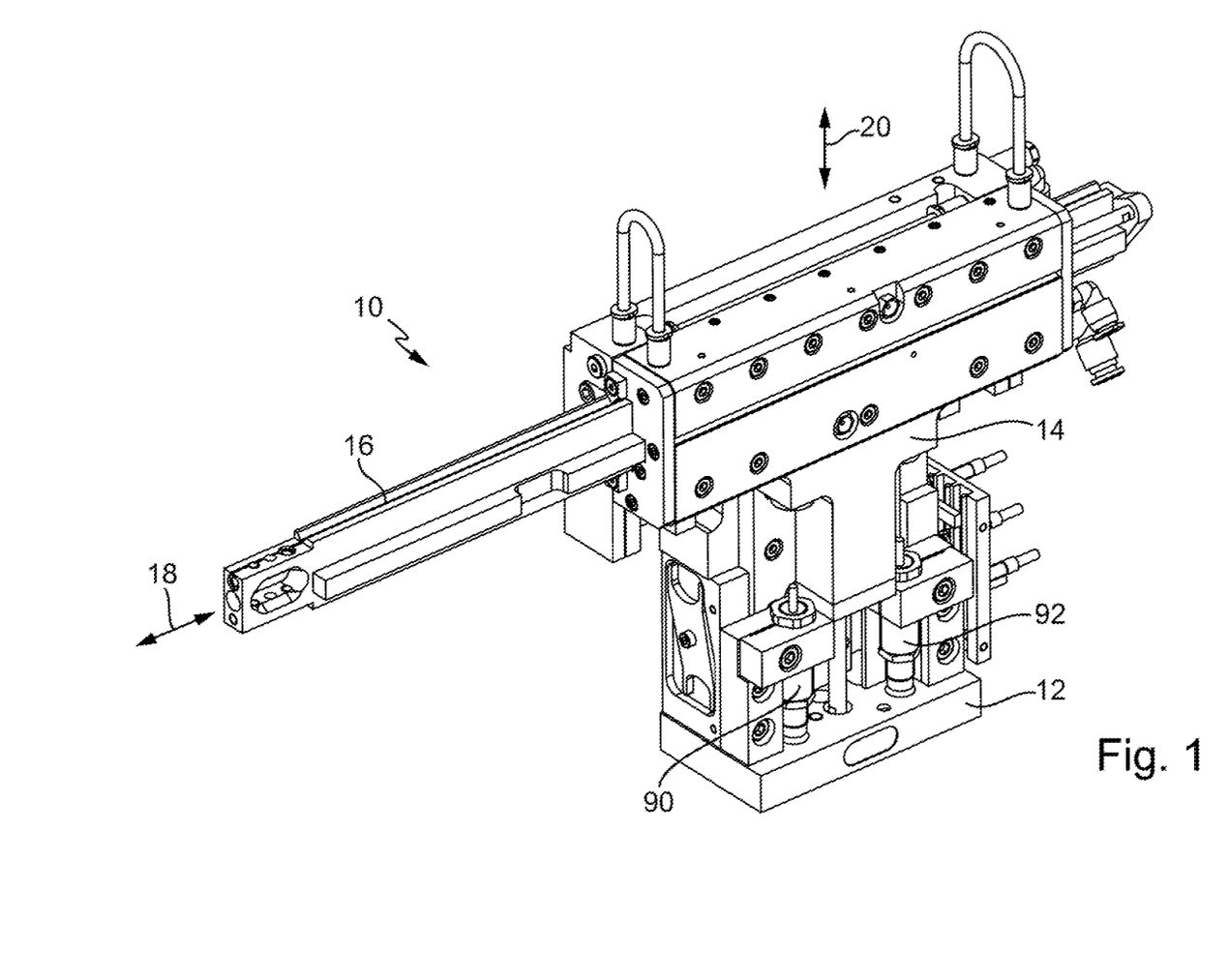
FIG. 1 shows a perspective view of a handling unit.
Figure 2:
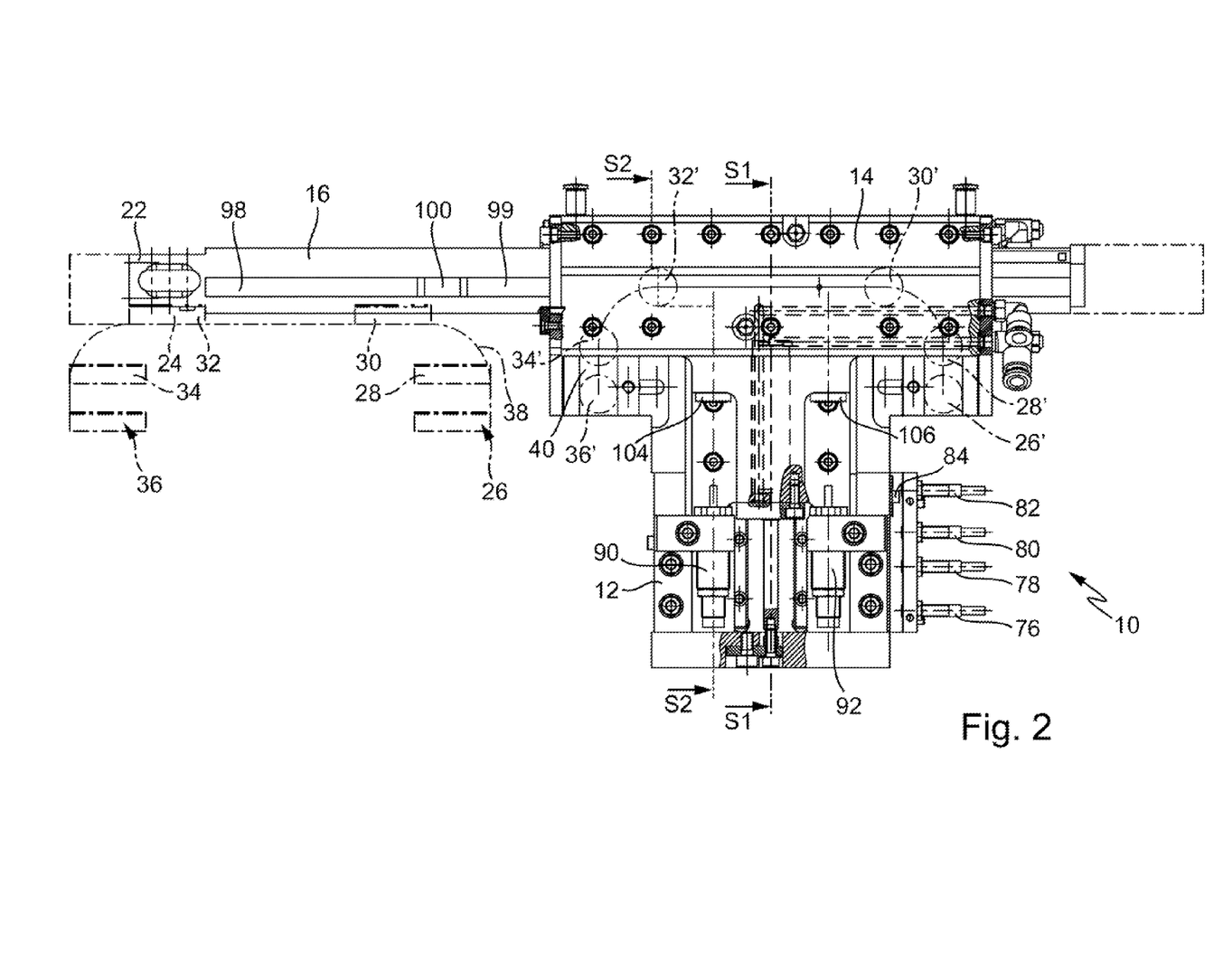
FIG. 2 shows a front view of the handling unit.

As is illustrated in FIG. 2, the handling arm 16 has a free end 22 which may e.g. be provided with an adapter plate 24.

As is indicated in FIG. 2 with dash-dotted lines, the free end 22 or the adapter plate 24 may be moved from a rear or retracted lower operating position 26 via different positions of movement 28 to 34 to a front lower operating position 36. The transfer is thereby realized along a path of movement 38.

Figure 7:
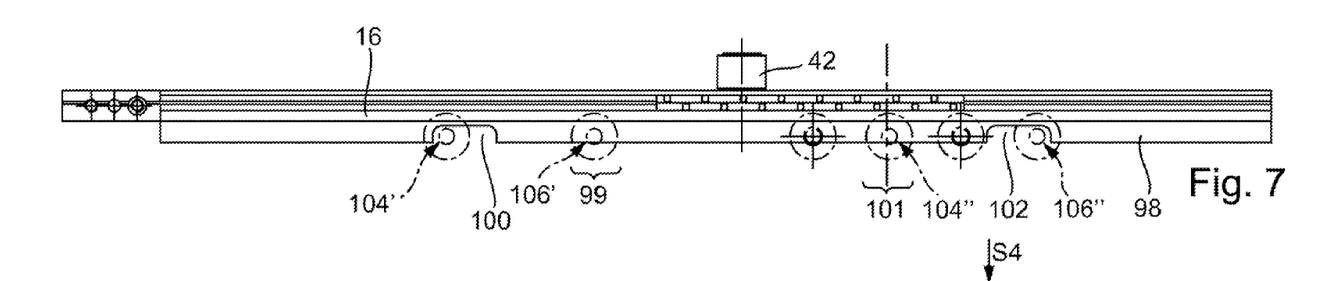
FIG. 7 shows a top view of the handling arm of the handling unit.
Figure 8:
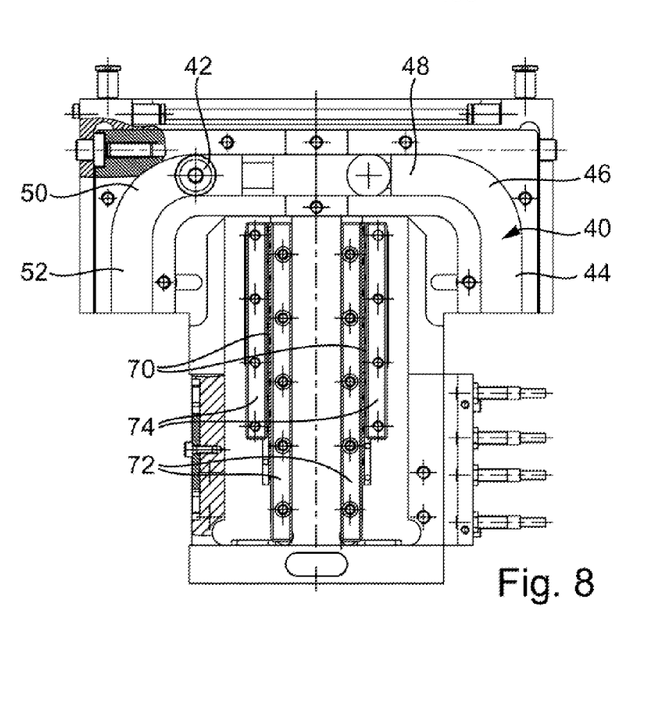
FIG. 8 shows a front view of the base part of the handling unit.

For realizing the path of movement 38, a guiding cam 40 is provided on the base part, into which a cam follower 42 on the side of the handling arm engages. The cam 40 is thereby clearly illustrated, in particular in FIG. 8, which shows a front view of the base part 12 without carriage 14 and without handling arm 16. FIG. 8 also shows the cam follower 42 which, as is illustrated in FIG. 7, is mounted to the handling arm 16. The cam follower 42 is thereby designed in the form of a rotationally mounted cam roller.

FIG. 2 shows associated positions 26' and 36' of the cam follower 42 in the two illustrated operating positions 26 and 36 and the movement positions 28 to 34 of the free end 22 of the handling arm 16. The cam path of the guiding cam 40, which corresponds to a "U" turned upside down, corresponds to the path of movement 38 of the free end 22 of the handling arm 16. As is illustrated, in particular, in FIG. 8, the guiding cam 40 comprises, starting from the rear lower operating position of the handling arm 16, a first vertical section 44, an adjacent first arc section 46, an adjacent horizontal section 48, an adjacent second arc section 50 and an adjacent second vertical section 52. For adjusting the horizontal stroke of the handling arm 16, the horizontal section 48 of the guiding cam 40 can be extended. Towards this end, the screws 54 illustrated in FIG. 4 on the rear side of the unit 10 can be released and the guiding cam 40 of the base part 12, which consists of two parts, can be moved along the elongated holes 58 towards each other or away from each other and be fixed by fastening the screws 54.

Figure 5:
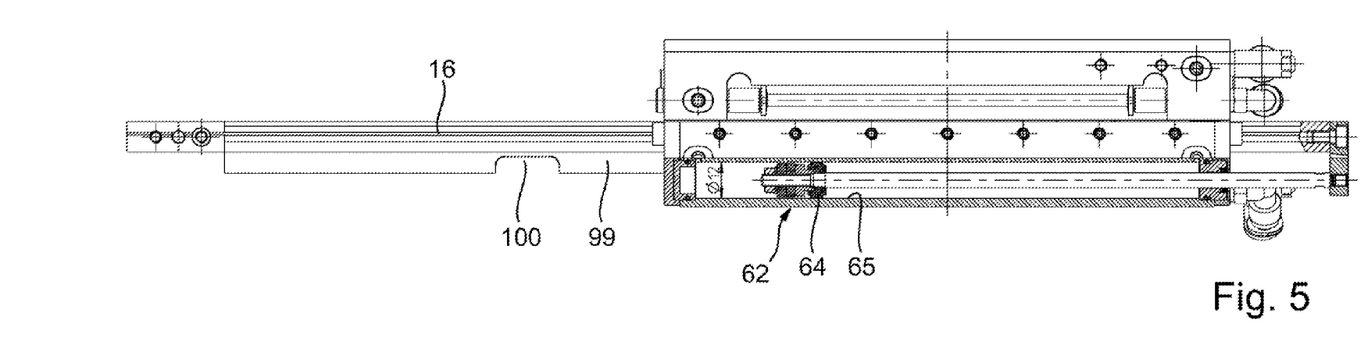
FIG. 5 shows a top view of the handling unit of FIG. 1 along the section S4-S4 of FIG. 9.
Figure 6:
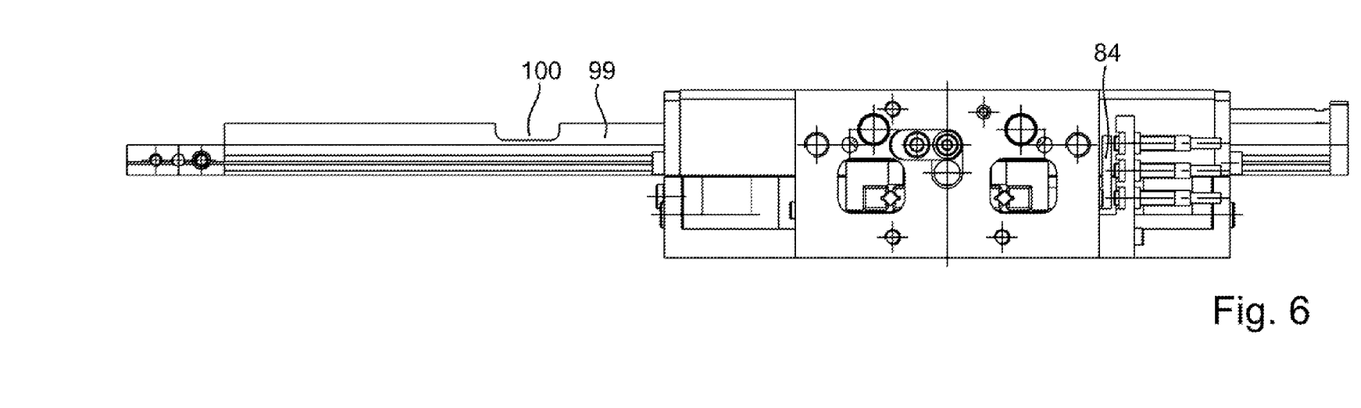
FIG. 6 shows a view from below of the handling unit.
Figure 9:
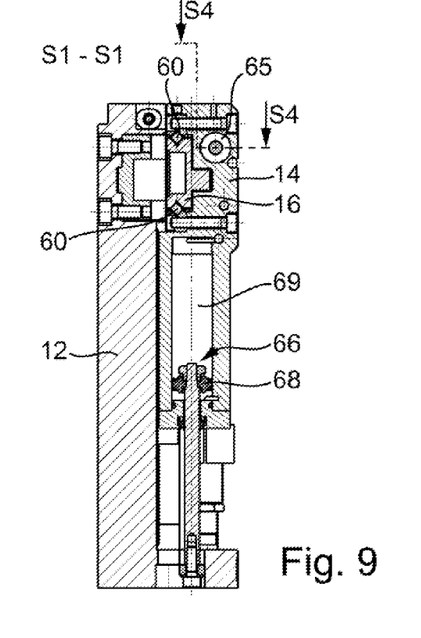
FIG. 9 shows a section through the handling unit along the line S1-S1 in FIG. 2.

As is illustrated in sectional view in accordance with FIG. 9, the handling arm 16 is disposed in such a fashion that it can be guided via linear bearings 60 on the carriage 14 along the first axis of movement 18. For moving the handling arm 16 along the first axis of movement 18, a first drive 62 is provided in the form of a cylinder piston unit as is illustrated in FIG. 5. Towards this end, a piston 64 is provided which is fixed to the handling arm 16 and is located in a cylinder 65 on the side of the carriage. The piston 64 can be loaded with pressure from both sides. Depending on the pressurization of the pressure chambers, the piston 64 can be moved along the first axis of movement 18 together with the handling arm 16.

For adjusting the carriage 14 with respect to the base part 12, a second drive 66 is provided as is clearly shown, in particular in FIG. 9, which is also designed as a cylinder piston unit. The drive 66 comprises a piston 68 which is fixed to the base part 12 and accommodated in a cylinder 69 formed by the carriage 14. The piston 68 delimits two pressure chambers. Depending on the pressurization of the pressure chambers, the carriage 14 can be moved with respect to the base part 12 in the direction of the second axis of movement 20.

The two drives 62 and 66 can be driven independently of each other.

Figure 12:
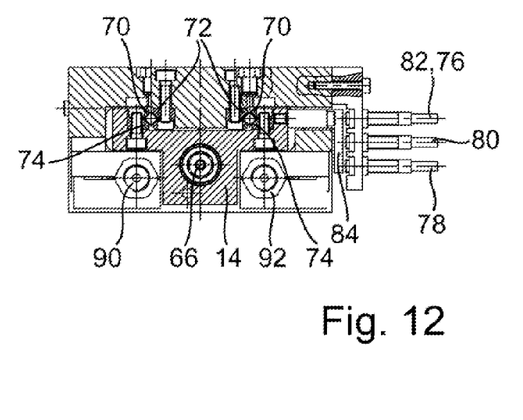
FIG. 12 shows a cross-section through FIG. 9.

As is clearly illustrated in FIGS. 8 and 12, the carriage 14 is disposed on the base part 12 such that it can be guided via linear bearings 70. As is clearly shown in FIG. 8, guiding rails 72 are mounted to the base part 12 for this purpose, which communicate with guiding rails 74 on the carriage side e.g. via rolling elements.

A total of four proximity switches 76, 78, 80 and 82 are provided on the base part 12 for defined drive of the two drives 62 and 66, which are e.g. clearly illustrated in FIGS. 2, 3, 4 and 6. A switching element 84 is disposed on the carriage 14, which is clearly shown in particular in FIGS. 6 and 12.

Depending on the vertical position of the carriage, the switching element 84 changes its vertical position.

Figures 3, 4:
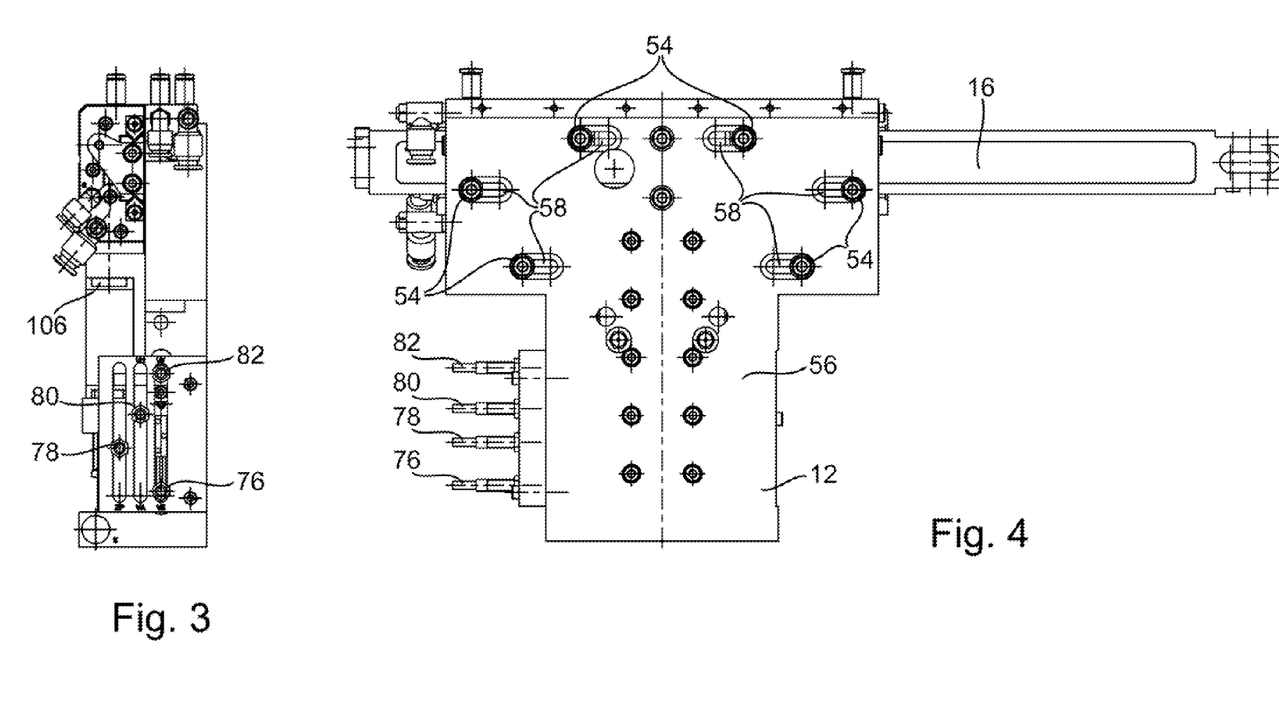
FIG. 3 shows a side view from the right-hand side of the handling unit.
FIG. 4 shows a rear view of the handling unit.

In the rear lower operating position 26 of the handling arm 16 illustrated in FIG. 2 the switching element 84 communicates with the lowermost proximity switch 76 which is also clearly illustrated in FIG. 2 or 3. During operation of the unit 10, the second drive 66 is driven for lifting the carriage 14 due to detection of the rear lower operating position due to switching of the proximity switch 76. The carriage 14 is consequently lifted. When the movement position 28 or 28' indicated in FIG. 2 is reached, the proximity switch 80 is operated by the switching element 84. In this feed position, the first drive 62 is also driven in addition to the second drive 66 in such a fashion that the handling arm 16 is loaded in the extended position. Due to the cam path, the handling arm cannot yet be moved in a forward direction along the first axis of movement 18 in the position 28 or 28'. Driving the first drive 62 preloads the handling arm 16 in a forward direction along the first axis of movement. When the carriage 14 is further lifted, the handling arm 16 can be moved with very high acceleration into the extended position due to the preloading of the drive 62.

When the handling arm 16 has reached its upper stroke end position 30, the switching element 84 communicates with the proximity switch 82. When the position 32 or 32' has been reached, the switching element 84 leaves the proximity switch 82. The second drive 66 is switched over, since the proximity switch 82 has been switched off, such that the carriage 14 is moved in a downward direction. When the switching element 84 reaches the proximity switch 78, the front lower operating position 36 or 36' is reached. A gripper which is e.g. disposed on a plate 24 can then grip one part. After successful gripping, the free end of the handling arm 16 can be transferred from its front lower operating position 36 into its rear lower operating position 26 through correspondingly driving the drives 62 and 66.

Very high cycle times can be realized, since the first drive 62 is already driven in the position 28', in which movement of the handling arm 16 in the direction of the first axis of movement 18 is not yet possible.

In a further development of the invention, which is not shown in the figures, switching elements may also be provided on the carriage 14 which can be used to retrieve characteristic positions of the handling arm along the first axis of movement 18.

For damping the movement of the carriage 14 in the two lower operating positions 26 and 36, two stop elements 90 and 92 in the form of shock absorbers are provided on the base part, which can be adjusted independently of each other in the direction of the second axis of movement 20. As is illustrated, in particular in FIG. 10, each of the two stop elements 90, 92 has a threaded sleeve 94 which are each screwed into a threaded bore 96 on the base part side. The axial adjustment may vary depending on the screwing depth. The two stop elements 90 and 92 each have a stop member 93 which can be shifted in a damped fashion in the direction of the second axis of movement 20 with respect to the threaded sleeve 94. The height of the front lower operating position can be adjusted via one stop element 90. The other adjustment element 92 adjusts the height of the rear lower operating position.

As is illustrated, in particular in FIG. 7, the handling arm 16 has a lateral web 98 which extends along its longitudinal axis. The web 98 forms two stop sections 99 and 101 and moreover has two recessed sections 100 and 102. In particular, FIG. 7 clearly shows that the recessed section 100 is located between the free end 22 of the handling arm 16 and the stop section 99.

It would be feasible for the handling arm to have only such a length that the recessed section 102 facing away from the free end 22.

Figure 10:
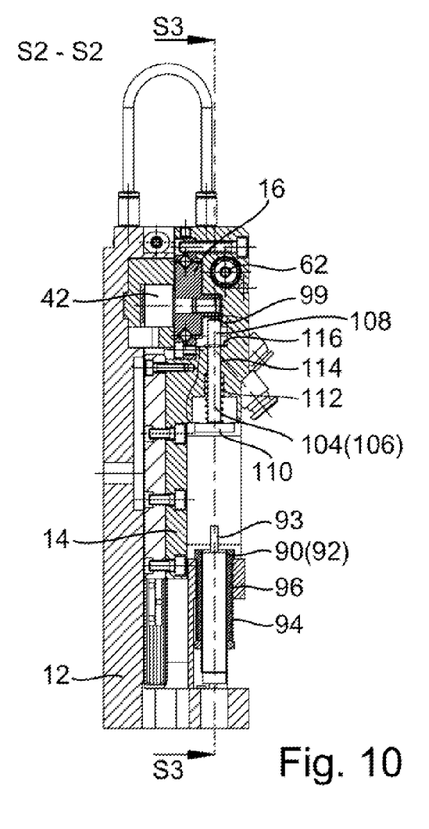
FIG. 10 shows a section through the handling unit along the line S2-S2 in FIG. 2.
Figure 11:
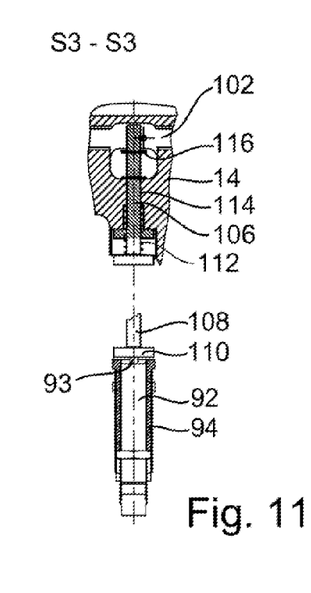
FIG. 11 shows a section along the line S3-S3 of FIG. 10.

Two intermediate links 104 and 106 are provided in the carriage 14, wherein one intermediate link 104 cooperates with the stop 90 and the other intermediate link 106 cooperates with the stop 92. FIGS. 10 and 11 show that the intermediate links 104 and 106 are designed like a piston and have a rod 108 and a plate 110. The free end of the rod 108 is provided to act against the stop section 101 of the web 98 of the handling arm 16. The two recessed sections 100 and 102 are selected in such a fashion that the rear recessed section 102 cooperates with the rear intermediate link 106 in the front lower operating position, and that in the rear lower operating position 26 the front recessed section 100 cooperates with the front intermediate link 104. In the front lower operating position 36 the stop section 99 of the web 98 consequently cooperates with the free end of the rod 108 of the intermediate link 104 as is also illustrated in FIG. 10. The plate 110 of the intermediate link 104 then contacts the impact member 93 of the stop element 90 in the front lower operating position.

As mentioned above, the recess 102 corresponds to the other intermediate link 106 in the front lower operating position 36 such that the free end of the rod 108 of the intermediate link 106 is not loaded by the handling arm 16. As is illustrated in FIG. 11, the intermediate link 106 is then immersed into the carriage 14 in the front lower operating position 36 and does not provide any considerable resistance and therefore no stop upon reaching the front lower operating position 36. Only the stop element 90, which cooperates with the stop section 101, is responsible as stop in the direction of the second axis of movement 20 in the front lower operating position.

In the rear lower operating position 26 it is exactly vice versa. In this operating position 26, the front stop element 90 corresponds to the associated intermediate link 104 such that the intermediate link 104 cooperates with the recessed section 102. When the intermediate link 104 impinges on the associated impact element 90, the intermediate link 104 is consequently immersed in an axial upward direction into the carriage 14 and does not offer any considerable resistance or stop. In the operating position 26, the rear intermediate link 106 communicates with the stop section 99 of the web 98 of the handling arm 16. In so far, the intermediate link 106 cannot be immersed in the axial position into the carriage 14. It consequently strikes the impact member 93 of the rear stop element 92 upon reaching the operating position 26. The height of the rear lower operating position 26 is consequently only predetermined by the screwing depth of the rear stop element 92 in the base part 12.

The two intermediate links 104 and 106 in FIG. 7 are illustrated in the rear operating position with reference numerals 104' and 106' and also in the front operating position with reference numerals 104" and 106".

The figure clearly shows how the intermediate link 104' engages in the recess 100 in the rear operating position and the intermediate link 106' acts against the stop section 99. It is moreover clearly illustrated how the intermediate link 104" acts against the stop section 101 of the handling arm 16 in the front operating position and the intermediate link 106" engages in the recessed section 102. When the intermediate links 104 or 106 engage in an associated recessed section 100 or 102, these intermediate links do not act as a stop. The intermediate links are rather immersed into the associated recessed section in the respective operating position.

In particular, FIG. 10 shows that the rods 108 of the intermediate links 104 and 106 penetrate through through-holes 114 provided in the carriage 14. The intermediate links 104 and 106 moreover have locking washers 116 as securing device in the area of their free ends.

In order to ensure a defined position of the two intermediate links 104 and 106, these are held under pretension in their axial lower position by means of coil springs 112.

Figure 13:
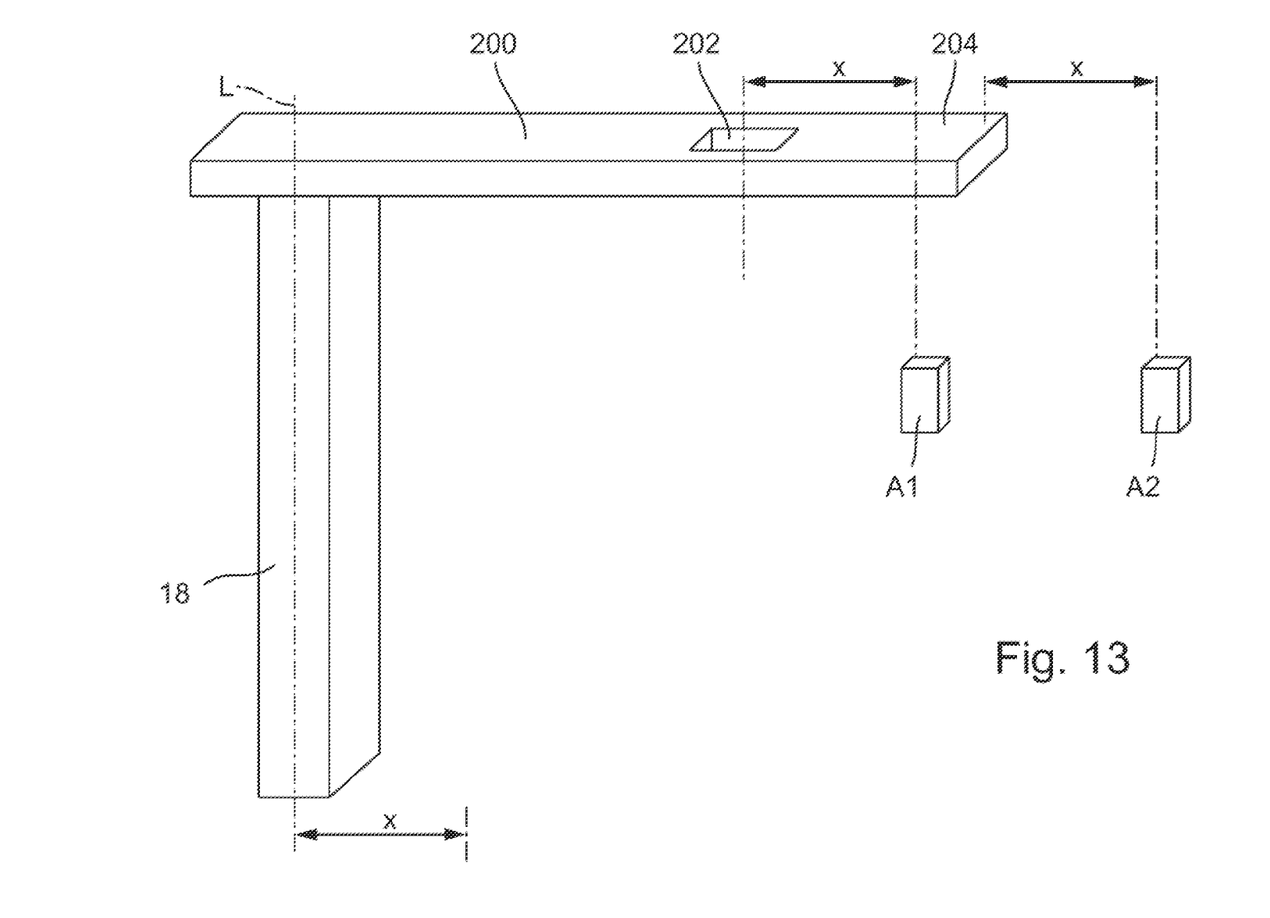
FIG. 13 shows the handling arm of a further embodiment.

The handling arm 16 of FIG. 13 is in the form of an embodiment described in DE 200 04 746 U1. A cross member 200 is provided on the handling arm 16, which corresponds to the cross member 59 of DE 200 04 746 U1. The cross member 200 has a recessed section 202 and a stop section 204, wherein the recessed section 202 is disposed on the cross member 200 between the longitudinal axis L of the handling arm 16 and the stop section 204. FIG. 13 shows the front upper intermediate position.

The handling arm 16 can be displaced by the stroke x in the horizontal direction into the rear position. In the front lower operating position, the stop element A1 acts against the stop section 204 and the stop element A2 remains free of contact due to the correspondingly selected length of the cross member 200. In the rear lower operating position, the stop element A1 is immersed into the recessed section 202 and the stop element A2 acts against the stop section 204. Both stop elements A1 and A2 can be adjusted in height independently of each other such that the stroke end positions of the handling arm 16 can be adjusted in height.

I claim:

1. A handling unit for relocating parts, the handling unit comprising:
    a base part having a guiding cam;
    a carriage disposed on said base part, said carriage and said base part structured for displacement of said carriage relative to said base part along a second axis of motion;
    a handling arm disposed on said carriage, said handling arm and said carriage being structured for displacement of said handling arm relative to said carriage in a linear direction along a first axis of motion, wherein said second axis of motion is transverse to said first axis of motion, said handling arm having at least one cam follower for engagement in said guiding cam of said base part;
    a first drive structured for adjusting said handling arm along said first axis of motion; and
    a second drive structured for adjusting said handling arm along said second axis of motion, wherein at least one of said first and said second drives loads said handling arm in a direction of an associated axis of motion before said cam follower enables motion of said handling arm in said direction of said associated axis of motion.

2. The handling unit of claim 1, wherein at least one of said first and said second drives is designed as a cylinder piston unit that can be loaded with pressure.

3. The handling unit of claim 2, wherein a piston of said first drive is fixed to said handling arm and a cylinder of said first drive is defined by said carriage.

4. The handling unit of claim 2, wherein a piston of said second drive is fixed to said base part and a cylinder of said second drive is defined by said carriage.

5. The handling unit of claim 1, wherein said guiding cam has a first vertical section, an adjacent first arc section, an adjacent horizontal section, an adjacent second arc section and an adjacent second vertical section.

6. The handling unit of claim 1, further comprising switches disposed on said base part for detecting a stroke position of said carriage and for driving said second drive.

7. The handling unit of claim 6, wherein at least three switches are disposed on said base part, arranged on top of each other, for detecting at least three stroke positions of said carriage, wherein said at least three switches comprise at least three of a first switch for detecting a rear lower operating position, wherein, upon detection of said rear lower operating position, said second drive is driven for lifting said carriage, a second switch for detecting a feed position prior to reaching an upper operating position, wherein, upon detection of said feed position, said first drive is also driven simultaneously with said second drive for extending said handling arm, a third switch for detecting an upper operating position, wherein, upon detection or leaving said upper operating position, said second drive is switched over for lowering said carriage and a fourth switch for detecting a front lower operating position.

8. The handling unit of claim 7, wherein when said front lower operating position has been detected and a confirmatory value is present, said second drive is switched over for lifting said carriage.

9. The handling unit of claim 1, further comprising switches disposed on said carriage for detecting a stroke position of said handling arm and for driving said first drive.

10. The handling unit of claim 1, further comprising shock absorbers disposed on said base part for damping a motion of said carriage when a lower operating position has been reached.

11. The handling unit of claim 10, wherein a vertical position of said shock absorbers can be adjusted for adjusting said lower operating position.

12. A method for operating the handling unit of claim 1, the method comprising the steps of:
    detecting a rear lower operating position and, upon detection of said rear lower operating position, said second drive is driven for lifting said carriage;
    detecting, prior to reaching an upper operating position, a feed position and, upon detection of said feed position, said first drive is also driven simultaneously with the second drive for extending said handling arm;
    detecting an upper operating position and, upon detection or leaving said upper operating position, said second drive is switched over for lowering said carriage; and
    detecting an extended lower operating position and, upon detection of said lower operating position, said second drive remains switched on, is switched on or is switched over.

13. A handling unit for relocating parts, the handling unit comprising:
    a base part having a guiding cam;
    a carriage disposed on said base part, said carriage and said base part structured for displacement of said carriage relative to said base part along a second axis of motion;
    a handling arm disposed on said carriage, said handling arm and said carriage being structured for displacement of said handling arm relative to said carriage in a linear direction along a first axis of motion, wherein said second axis of motion is transverse to said first axis of motion, said handling arm having at least one cam follower for engagement in said guiding cam of said base part;
    a first drive structured for adjusting said handling arm along said first axis of motion; and
    a second drive structured for adjusting said handling arm along said second axis of motion, wherein said first drive is provided between said handling arm and said carriage for moving said handling arm along said first axis of motion and said second drive is provided between said carriage and said base part for moving said carriage along said second axis of motion.

14. The handling unit of claim 13, wherein at least one of said first and said second drives is designed as a cylinder piston unit that can be loaded with pressure.

15. The handling unit of claim 13, wherein said guiding cam has a first vertical section, an adjacent first arc section, an adjacent horizontal section, an adjacent second arc section and an adjacent second vertical section.

16. The handling unit of claim 13, further comprising switches disposed on said base part for detecting a stroke position of said carriage and for driving said second drive.

17. The handling unit of claim 13, further comprising switches disposed on said carriage for detecting a stroke position of said handling arm and for driving said first drive.

18. The handling unit of claim 16, wherein at least three switches are disposed on said base part, arranged on top of each other, for detecting at least three stroke positions of said carriage, wherein said at least three switches comprise at least three of a first switch for detecting a rear lower operating position, wherein, upon detection of said rear lower operating position, said second drive is driven for lifting said carriage, a second switch for detecting a feed position prior to reaching an upper operating position, wherein, upon detection of said feed position, said first drive is also driven simultaneously with said second drive for extending said handling arm, a third switch for detecting an upper operating position, wherein, upon detection or leaving said upper operating position, said second drive is switched over for lowering said carriage and a fourth switch for detecting a front lower operating position.

19. The handling unit of claim 13, further comprising shock absorbers disposed on said base part for damping a motion of said carriage when a lower operating position has been reached.

* * * * *